(12) United States Patent
Bayer et al.

(10) Patent No.: US 7,638,733 B2
(45) Date of Patent: Dec. 29, 2009

(54) METHOD FOR CHECKING A BORE HOLE

(75) Inventors: Erwin Bayer, Dachau (DE); Mark Geisel, Kammerberg (DE); Thomas Herzinger, Munich (DE)

(73) Assignee: MTU Aero Engines GmbH, Munich (DE)

( * ) Notice: Subject to any disclaimer, the term of this patent is extended or adjusted under 35 U.S.C. 154(b) by 192 days.

(21) Appl. No.: 10/578,927

(22) PCT Filed: Oct. 23, 2004

(86) PCT No.: PCT/DE2004/002368

§ 371 (c)(1),
(2), (4) Date: Feb. 1, 2007

(87) PCT Pub. No.: WO2005/044507

PCT Pub. Date: May 19, 2005

(65) Prior Publication Data

US 2007/0210044 A1 Sep. 13, 2007

(30) Foreign Application Priority Data

Nov. 6, 2003 (DE) ................. 103 51 874

(51) Int. Cl.
*B23K 26/38* (2006.01)
(52) U.S. Cl. .............. 219/121.71; 219/121.83
(58) Field of Classification Search .......... 219/121.7, 219/121.71, 121.83, 121.62; 700/166
See application file for complete search history.

(56) References Cited

U.S. PATENT DOCUMENTS

| 4,608,480 | A | * | 8/1986 | Bizot et al. ............ 219/121.7 |
| 5,026,964 | A | * | 6/1991 | Somers et al. .......... 219/121.7 |
| 5,045,669 | A | * | 9/1991 | Ortiz et al. ............ 219/121.83 |
| 5,166,891 | A | * | 11/1992 | Reiter et al. ............ 700/166 |
| 5,670,068 | A | * | 9/1997 | Kuriyama et al. ...... 219/121.83 |
| 5,698,120 | A | * | 12/1997 | Kurosawa et al. ...... 219/121.83 |
| 6,201,214 | B1 | * | 3/2001 | Duffin .................. 219/121.71 |
| 6,934,014 | B1 | * | 8/2005 | Kleinhuber ............ 219/121.83 |
| 2002/0033384 | A1 | * | 3/2002 | Hirose et al. ........... 219/121.7 |

FOREIGN PATENT DOCUMENTS

| DE | 38 35 980 | | 4/1990 |
| DE | 4207169 | A1 * | 9/1993 |
| EP | 0 364 914 | | 4/1990 |
| EP | 0 937 532 | | 8/1999 |
| WO | WO 86/02301 | | 4/1986 |
| WO | WO-01/26859 | A1 * | 4/2001 |

OTHER PUBLICATIONS

International Search Report, PCT International Patent Application No. PCT/EP2004/002368, dated Feb. 21, 2005 (translated).
International Preliminary Examination Report, PCT International Patent Application No. PCT/EP2004/002368, dated Mar. 24, 2006 (translation of Annex provided).
Written Opinion of the International Searching Authority, PCT International Patent Application No. PCT/EP2004/002368 (translation of Supplementary Pages provided).
International Preliminary Report on Patentability, PCT International Patent Application No. PCT/DE2004/002368 (English-language translation provided).

* cited by examiner

*Primary Examiner*—Geoffrey S Evans
(74) *Attorney, Agent, or Firm*—Kenyon & Kenyon LLP

(57) ABSTRACT

Pulsed laser drilling is used to produce bore holes having a small diameter, for example, in hollow workpieces. Turbine blades, e.g., have a multitude of fine cooling air bore holes, which are able to be produced by this method, e.g., with high positional accuracy and in an automated manner.

A checking method is provided by which drilling faults, e.g., with regard to piercing and bore-hole geometry, may be detected in a more reliable manner.

A method is for checking a bore hole introduced in a workpiece by laser pulses, in which characteristic signals from the area of the bore hole are received with the aid of a sensor and compared to setpoint values and only signals received in a characteristic time interval following a laser pulse are taken into account.

6 Claims, No Drawings

METHOD FOR CHECKING A BORE HOLE

FIELD OF THE INVENTION

The present invention relates to a method for checking a bore hole.

BACKGROUND INFORMATION

Pulsed laser drilling is used to produce bore holes having small diameters, for example, in hollow workpieces. Turbine blades, in particular, have a multitude of fine cooling air bore holes, which this method is able to produce with high positional accuracy and in an automated manner.

However, in order to achieve the cooling air flow rate required during operation these bore holes have to conform to exact tolerances with regard to their diameter. For that reason, the dimensional accuracy of the produced bore holes must be checked.

Furthermore, it should be ensured, for one, that the bore hole is complete, i.e., that it is not just a blind hole that is produced, and, for another, that the laser pulses are not continued once a bore hole has been completed and possibly damage the wall regions located behind it.

For this reason, various methods for automated piercing and diameter detection have already been proposed, which infer the piercing instant and bore-hole diameter in a variety of manners on the basis of changes in specific features of the process radiation during pulsed laser drilling, cf., German Published Patent Application No. 38 35 980. However, drilling errors may still occur even when using such checking methods, which cannot be tolerated given the high quality standards prevailing in the aerospace field, in particular.

SUMMARY

Example embodiments of the present invention may provide a checking method which may detect drilling faults in a more reliable manner.

According to example embodiments of the present invention, to check a bore hole that is introduced in a workpiece by laser pulses, characteristic signals from the area of the bore hole are received with the aid of a sensor and compared to setpoint values and only signals that are received in a characteristic time interval following a laser pulse are taken into account.

In contrast to conventional methods, which check the process radiation during the duration of a laser pulse, the checking according to example embodiments of the present invention is implemented exclusively on the basis of signals received following a laser pulse. This may detect drilling faults in a much more reliable manner since parts of the workpiece material are still present in the molten phase during and also even shortly after the process radiation has expired. Different physical phenomena, in particular minimizing the boundary surface energy, may cause the molten phase to find its way into the bore hole, where it solidifies and results in a partial or complete occlusion of the bore hole. High-speed recordings by a video camera provide proof of the occurrence of such drilling faults.

Drilling faults of this type may not be detected by methods which examine the process radiation, but are able to be discovered by the method described herein since it begins the check only after these physical phenomena have run their course.

The comparison of the received signals with the setpoint values may be performed according to conventional methods, such as those described, for example, in German Published Patent Application No. 38 35 980.

The characteristic time interval may be defined as a function of material properties of the workpiece and process parameters of the laser pulse. Different instants for the beginning and the end of the time interval are possible. The absolutely earliest meaningful instant for the beginning is the instant at which at least a thin skin of the bore hole wall has solidified again, e.g., the solidification of the entire molten material. It is also possible to wait out a short interval thereafter. The earliest instant for the end of the time interval is given by the minimum length of the time interval required to receive a sufficient quantity of signal data. The latest instant for the end is the beginning of a subsequent laser pulse.

The individual instants may be ascertained empirically or by simulations, e.g., according to conventional methods.

Signals of an optical and/or thermal type may be received, which are emitted or reflected from the region of the bore hole. Accordingly, it may be easy to infer drilling faults on the basis of such data, e.g., with the aid of conventional methods. However, acoustic signals are possible as well since the acoustic properties of an ideally circular bore hole differ significantly from those of a faulty drill hole.

The use of a CCD camera for the reception of the signals may be provided. Such cameras are available for the optical and thermal (IR) range and, with minimal manipulation, may provide a much larger data quantity than optical or thermal point sensors. However, other electronic cameras such as a CMOS camera may be suitable as well.

From the beginning of the time interval, a measuring signal of an optical and/or thermal type may be emitted in the direction of the region of the bore hole. In this manner, one is no longer limited to the reception of signals that still result from the energy input by the previous laser pulse, i.e., optical and/or thermal radiation of the already solidified, but presently still glowing, then still hot to warm bore hole wall.

The measuring signal may be emitted by the drilling laser or some other emitter. Decisive may be that the energy input in the bore remains low enough so that the wall material of the bore hole will not melt again.

The method hereof may be particularly suitable for checking the piercing of the workpiece wall and/or for deviations from a predefined drilling geometry, e.g., in the case of turbine blades since the quality standards may be especially high and may not be fully met by conventional methods.

Example embodiments of the method hereof are described in greater detail below.

DETAILED DESCRIPTION

In an exemplary embodiment, a characteristic time interval that is suitable for a given workpiece and specific laser parameters is first determined empirically. To this end, some workpiece material is first melted and then observed during the transition from the molten to the solid phase, using an IR-CCD camera, in order to ascertain characteristic IR signals for the phase transition. Subsequently, continuous monitoring of a laser bore hole takes place with the aid of this IR-CCD camera. At a time when a relative equilibrium has already come about between energy input by the laser pulses and energy removal by heat transfer via bore hole wall and air, the time characteristic of the bore hole cooling is monitored, starting directly after the end of a laser pulse. This monitoring is repeated several times and the individual instant determined at which the characteristic signal of the phase transition is achieved at significant points of the bore hole. These times are averaged. The average value provides a reliable measure for the beginning of the characteristic time interval for the entire duration of the laser drilling since it is assumed that the cooling at the beginning of the drilling, i.e., before the relative equilibrium is reached, occurs faster due to the still cold bore hole environment. Selected as the end of the characteristic time interval is the beginning of the new laser pulse. Thus, one empirically obtains a defined time interval that begins at an instant a following the end of a preceding laser pulse, and that ends at an instant b at the beginning of a subsequent laser pulse.

Once a suitable characteristic time interval has been defined in this manner, the actual production monitoring of a turbine blade may take place. To this end, during the production process of each bore hole, the IR signals of the IR-CCD camera received during the characteristic time interval following each laser pulse are compared to previously defined setpoint values. The comparison may be implemented according to conventional methods, for example, those described in German Published Patent Application No. 38 35 980.

In this exemplary embodiment, a complete IR image of the bore hole is recorded continuously with the aid of the IR radiation emitted from the region of the bore hole and received by the IR-CCD camera, and used to determine the piercing of the workpiece wall and deviations from a predefined bore hole geometry.

According to an exemplary embodiment, at the beginning of the characteristic time interval an optical measuring signal is emitted in the direction of the bore hole region, where it is absorbed and re-emitted in the form of IR radiation. This additional measuring signal may increase the measuring accuracy. However, care should be taken that the additionally input energy does not cause renewed melting of the bore hole wall and thereby damages the bore hole. The optical measuring signal may be generated in a simple manner with the aid of the drilling laser (by shortening the pulse duration and or intensity), but also by other emitters such as a stroboscope or by continuous illumination regularly interrupted by a chopper. Synchronization of laser drill pulses and measuring signals may be provided, whose uniform interval should be ensured in order to exclude drilling errors due to uneven heating.

The methods described above may be especially suitable for the rapid and simple checking of laser bore holes in turbine blades, since particularly high quality standards may be required, which may not be able to be fully met by conventional methods.

The foregoing should not be considered to be restrictive.

For example, the use of the method not only allows monitoring of the piercing and/or the bore hole geometry, but also the instantaneous bore hole depth, for example.

Furthermore, for a number of applications with slightly lower quality standards, measurements using optical/thermal/acoustic point sensors instead of a CCD camera or CMOS camera may be sufficient as well.

What is claimed is:

1. A method for checking a bore hole, comprising:
shaping the bore hole in a workpiece by laser pulses that cause melting of a bore wall;
receiving characteristic signals from a region of the bore hole by a sensor;
comparing characteristic signals received within a characteristic time interval following a laser pulse to setpoint values, the characteristic time interval defined as a function of material properties of the workpiece and as a function of process parameters of the laser pulse, the characteristic time interval beginning at an earliest as soon as at least a thin skin of the bore wall has solidified after melting by a preceding laser pulse and ending at a latest as soon as a new laser pulse occurs.

2. The method according to claim 1, wherein the characteristic time interval begins as soon as an entire melted material has solidified, a length of the characteristic time interval selected such that a sufficient quantity of signal data is receivable in the receiving step.

3. The method according to claim 1, wherein the characteristic signals are received in the receiving step by at least one of (a) a CCD camera and (b) a CMOS camera.

4. The method according to claim 1, wherein the checking is performed with respect to at least one of (a) a piercing of a workpiece wall, (b) a bore-hole depth and (c) a deviation from a predefined bore hole geometry.

5. The method according to claim 1, further comprising emitting at least one of (a) an optical and (b) a thermal measuring signal in a direction of the region of the bore hole starting with the beginning of the characteristic time interval.

6. The method according to claim 5, wherein the measuring signal is emitted in the emitting step by a drilling laser.

* * * * *

UNITED STATES PATENT AND TRADEMARK OFFICE
CERTIFICATE OF CORRECTION

PATENT NO. : 7,638,733 B2  Page 1 of 1
APPLICATION NO. : 10/578927
DATED : December 29, 2009
INVENTOR(S) : Bayer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 290 days.

Signed and Sealed this

Ninth Day of November, 2010

David J. Kappos
*Director of the United States Patent and Trademark Office*